July 18, 1944.                J. MICKELSON                 2,353,916
                    TRACTION DEVICE FOR VEHICLE WHEELS
                        Filed April 30, 1942

Inventor
John Mickelson
By *Arthur H. Sturges,*
Attorney

Patented July 18, 1944

2,353,916

UNITED STATES PATENT OFFICE 2,353,916

TRACTION DEVICE FOR VEHICLE WHEELS

John Mickelson, Lincoln, Nebr.

Application April 30, 1942, Serial No. 441,141

2 Claims. (Cl. 152—56)

The present invention relates to traction devices for heavy duty tractors and the like such as army trucks.

It is an object of the invention to provide a traction assembly for the pneumatic tire of the wheel of a tractor having an annulus so shaped and arranged that at times when said tire is sufficiently inflated said assembly is thereby locked to said tire without the use of extraneous means.

Another object of the invention is to provide a device for said purpose the annulus of which may include a plurality of sections or segments so that said annulus may be compactly nested for storage by placing one segment within another and to provide means for readily joining said sections together for use upon a wheel tire without jacking said tire off the ground as may be desired.

A further object of the invention is to provide traction elements for said sections, so shaped and arranged that advantageous traction is assured at times when the vehicle travels upon soft earth, mud, ice and the like.

A still further object of the invention is to provide a plurality of ground engaging traction lugs secured in annular rows at opposite sides of the outer surface of the annulus of the assembly and to provide the lugs of said rows in spaced apart alternate staggered relation with respect to each other for distributing the weight of the vehicle thereon advantageously.

Another object of the invention is to provide means for holding adjacent end portions of the sections of the annulus in annular alignment at times when the weight of the vehicle is carried on a single lug such as during revolving movements of the wheel particularly during times when said lugs individually and progressively come in contact with a hard surface, such as a pavement, during said revoluble movements.

Other and further objects and advantages of the invention will be understood from the following detailed description thereof, reference being had to the accompanying drawing in which.

Figure 1:
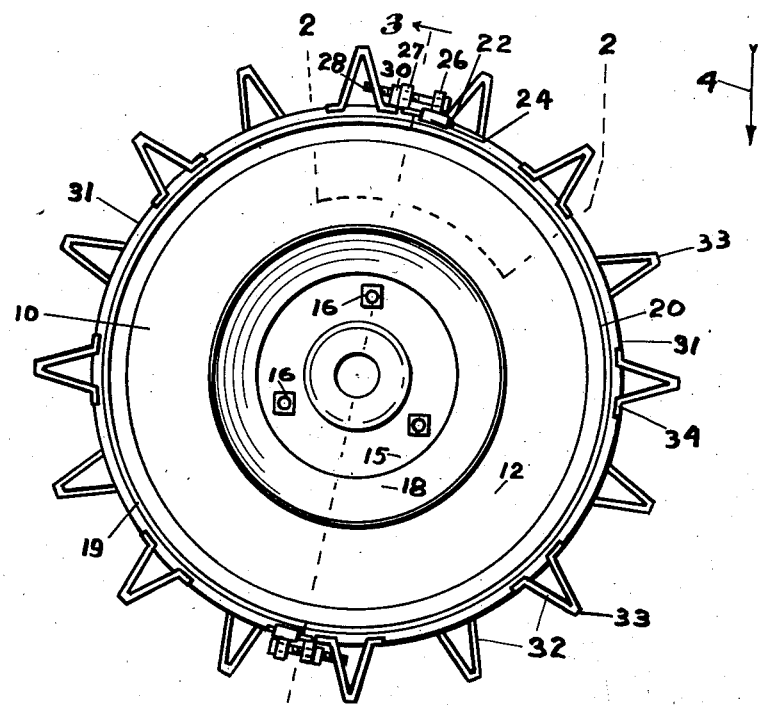
Figure 1 is a side elevation of the new device as applied in a position of use to the pneumatic tire of a vehicle wheel.

Referring now to the drawing for a more particular description 10 indicates a fully inflated tire having a tread portion 11 and oppositely disposed like side wall portions 12.

The particular disc wheel shown in the drawing includes two like half portions 14 and 15 each being provided with outwardly flared felloe portions respectively indicated at 17 and 18, whereby a trough therebetween is provided for receiving the side walls of the tire 10. The half portions of the wheel may be readily taken apart for mounting the tire 10 upon the wheel, prior to and inflation of the tire, by removing the bolts 16 which normally hold the half portions 14 and 15 together.

It will be understood that the herein described invention may be assembled and operated upon a tire at times when the latter is mounted upon any conventional type of vehicle wheel.

The new device includes a comparatively wide annulus which is preferably formed of a plurality of like sections or segments 19 and 20.

Figure 3:
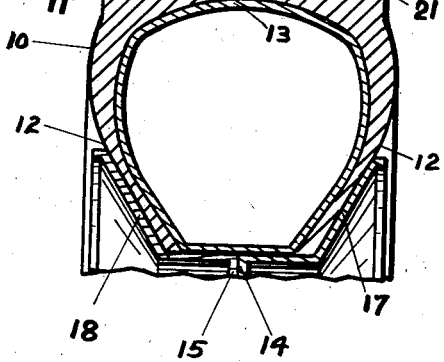
Figure 3 is a transverse section of a fragment of the invention, the view being taken substantially on line 3—3 of Figure 1.

As best shown in Figure 3, the annulus is of concavo-convex contour in transverse section the inner concave surface 21 thereof receiving the outer surface of the tread portion 11 of the tire snugly, at times when said tire is inflated, whereby the tire becomes locked to said annulus, transverse movements of the tread with respect to the annulus prevented and the later described traction assured.

Figure 2:
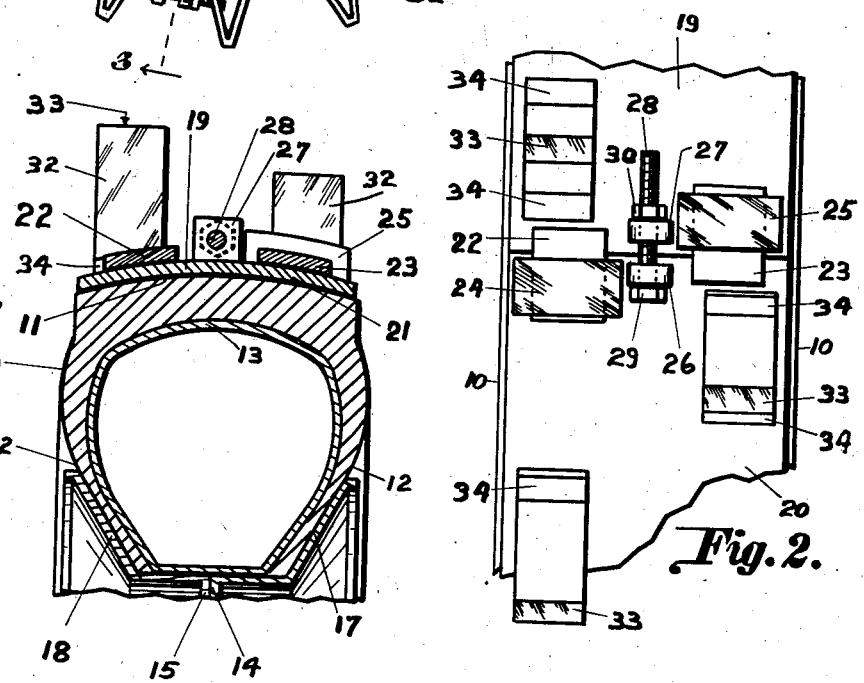
Figure 2 is a top plan view of a fragment of said device and tire, the view being taken between the dotted lines 2—2 of Figure 1 and looking in the direction of the arrow 4.

As best shown in Figure 2, the section 19 is provided with a tongue 22 secured thereto by any suitable means, such as welding, and the section 20 is similarly provided with a tongue 23, said tongues projecting beyond the ends of their respective sections being respectively received in complemental sockets 24 and 25 which are respectively welded or otherwise suitably secured on the sections 20 and 19, said tongues and sockets being provided at each end of each of the sections 19 and 20 for holding adjacent portions of said sections in annular alignment and true circular contour in side elevation for purposes later described.

As shown in Figure 2, the section 20 is provided with an ear 26 and a similar ear is welded on the section 19. The ears 26 and 27 are each provided with a suitable aperture for receiving therethrough the shank of a draw-bolt 28 so that the head 29 of the bolt is disposed against the ear 26 and the nut 30, threadedly carried by said bolt, is disposed against the ear 27 during use. A like assembly of ears and bolts is provided adjacent each end of each section and between the tongues and sockets thereof as shown in Figure 2.

Upon the convex surfaces 31 of the sections or annulus a plurality of spaced apart lugs 32 are provided. Each lug is preferably of substantially V-shape in side elevation as shown in Figure 1, the wider portions or feet 34 of said lugs being welded or otherwise suitably secured to the perimeters of the sections as best shown in Figures 2 and 3. The ground engaging traction lugs 32 are secured in annular rows to the outer surface of the annulus, said rows being disposed at opposite sides of the annulus. The lugs are in spaced apart staggered relation with respect to the rows thereof.

As thus described, it will be noted that during revoluble movements of the wheel, that the weight of the vehicle, carried by said wheel, becomes alternately shifted from side to side of the annulus alternately from row to row of the lugs, said weight being carried at times by each individual lug successively, progressively and individually particularly at times when the ends 33 of said lugs engage a hard surface such as the pavement of a roadway.

At times when a lug near an end of a section of the annulus carries the weight of the vehicle wheel the tongue and socket adjacent said lug prevents adjacent portions, at the sides of the comparatively wide annulus, from getting out of annular alignment with respect to each other, whereby said weight becomes evenly distributed upon the comparatively thin annulus and an even wear is applied to said tread and tire since an even distribution of said weight and pressure from the end of one section to the next adjacent section is occasioned.

In operation and assuming that the annulus is formed of a solid single piece the tire is deflated sufficiently to permit said tire to be forced within the annulus whereupon said tire is inflated for locking the latter to the annulus snugly and to a degree equivalent to the snug fit and locking of the side walls 12 of the inflated tire to the felloe of the wheel, whereby said tire does not creep upon said felloe during use and similarly said annulus does not creep upon the tread of said tire.

During operation and assuming that the annulus is formed of two sections each provided with the above described draw-bolts, ears, tongues and sockets, a section may be placed upon the upper portion of the tread of the tire and the vehicle moved for rolling the tire, without jacking the tire upwardly, until said section is disposed between the ground and the tire whereupon the other section is disposed similarly upon the then upper portion of said tire and at this time a small amount of air is permitted to escape through the conventional valve stem (not shown) of the inner tube 13 of the tire 10 for slightly deflating said tire whereupon the draw-bolts are positioned through the aperture of the ears 26 and 27 and the nuts 30 of said bolts rotated for attaching said sections together after which the tire is then inflated for locking the annulus to the tread thereof.

Among other advantages of providing the annulus in two segments or sections the latter may be nested compactly one within another for storage purposes or transportation upon a truck when not in use. Also a sectional annulus permits adjustment for slight differences in the diameters of the tread portions of tires.

From the foregoing description it is thought to be obvious that a traction device for the pneumatic tire of a truck or the like constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish it to be understood as limiting myself to the precise arrangement and formation of the several parts herein shown in carrying out my invention in practice except as claimed.

I claim:

1. A pneumatic tire armor comprising a sectional annulus having a concave inner surface and a convex outer surface, traction lugs carried by the outer surface of said annulus, an upstanding apertured ear carried by each section adjacent each end thereof and medially between the sides thereof, an upstanding U-shaped socket carried by each section adjacent each end thereof, the socket at one end being disposed on the side of an ear opposite from the socket at the opposite end of said section, a locking tongue fixed to each end of a section and projecting therefrom for engagement with a socket of an adjacent section, each tongue being positioned on the side of an ear opposite from a socket, said tongue slidably engaging in said sockets whereby the diameter of said annulus may be varied, and holding bolts engaging through adjacent ears.

2. A pneumatic tire armor as set forth in claim 1 wherein said traction lugs are of V-shape and disposed in staggered relation.

JOHN MICKELSON.